(12) United States Patent
Vance et al.

(10) Patent No.: US 7,580,728 B2
(45) Date of Patent: Aug. 25, 2009

(54) UNIVERSAL MOBILE GAMING DOCKING STATION AND CONTROLLER

(75) Inventors: Scott Vance, South Elgin, IL (US); Paul Navarrez, Van Nuys, CA (US); Sungwook Jung, Sunbuk-Gu (KR); Sang Ho Lee, Sunbuk-Gu (KR); Giovanni Pagnotta, Wilton, CT (US)

(73) Assignee: USA Wireless Solutions, Wood Dale, IL (US)

( * ) Notice: Subject to any disclaimer, the term of this patent is extended or adjusted under 35 U.S.C. 154(b) by 706 days.

(21) Appl. No.: 11/157,679

(22) Filed: Jun. 21, 2005

(65) Prior Publication Data

US 2006/0286943 A1    Dec. 21, 2006

(51) Int. Cl.
*H04Q 7/32* (2006.01)
(52) U.S. Cl. ............... 455/556.1; 455/550.1; 455/575.1; 455/557; 463/36
(58) Field of Classification Search ............... 455/575.1, 455/556.1–557, 550.1; 463/36–37, 39, 41, 463/44, 46–49; 345/168–169; D14/399–410
See application file for complete search history.

(56) References Cited

U.S. PATENT DOCUMENTS

| | | | |
|---|---|---|---|
| D325,225 S | 4/1992 | Adhida | |
| 5,259,626 A | 11/1993 | Ho | |
| D342,100 S | 12/1993 | Chan | |
| D345,164 S | 3/1994 | Grae | |
| D360,903 S | 8/1995 | Barr et al. | |
| D362,277 S | 9/1995 | Chan | |
| 5,624,117 A * | 4/1997 | Ohkubo et al. ........... 273/148 B |
| 5,737,028 A | 4/1998 | Bertram et al. | |
| D430,882 S | 9/2000 | Tsai | |
| 6,486,868 B1 | 11/2002 | Kazarian | |
| 6,530,838 B2 * | 3/2003 | Ha et al. ........................ 463/36 |
| D476,659 S | 7/2003 | Ying et al. | |
| 6,628,266 B1 | 9/2003 | Aguilar et al. | |
| D500,319 S | 12/2004 | Wada | |
| 6,888,533 B1 | 5/2005 | Oguro | |
| D527,005 S * | 8/2006 | Navarrez et al. ........... D14/401 |
| D544,481 S * | 6/2007 | Maddox et al. ............ D14/401 |
| 2002/0151282 A1 | 10/2002 | Wang | |
| 2002/0167491 A1 | 11/2002 | Huang et al. | |
| 2003/0052861 A1 | 3/2003 | Peng | |
| 2003/0073462 A1 | 4/2003 | Zatloukal et al. | |
| 2003/0078014 A1 | 4/2003 | Salminen et al. | |
| 2003/0153355 A1 | 8/2003 | Warren | |
| 2004/0103223 A1 | 5/2004 | Gabehart et al. | |
| 2004/0137983 A1 | 7/2004 | Kerr et al. | |
| 2005/0031127 A1 * | 2/2005 | Gosior et al. .................. 381/2 |
| 2006/0069543 A1 * | 3/2006 | Sajwani et al. ................ 703/24 |
| 2006/0252537 A1 * | 11/2006 | Wu ............................. 463/36 |
| 2008/0310108 A1 * | 12/2008 | Eriksson et al. ............. 361/697 |

* cited by examiner

*Primary Examiner*—Kamran Afshar
(74) *Attorney, Agent, or Firm*—Gerald E. Hespos; Anthony J. Casella

(57) ABSTRACT

The universal game controller is provided for use with a plurality of different types of cellular phones and permits gaming software on the cellular phones to be played in a convenient manner. The controller includes a phone dock for replaceably receiving any of a plurality of types of cellular phones. A receptor is provided for making electrical connection to the cellular phone. Control pads are provided for receiving pressure from a user's thumbs and generating control and command signals that can be transmitted to the cellular phone.

17 Claims, 12 Drawing Sheets

| FIG.8A-1 |
| FIG.8A-2 |

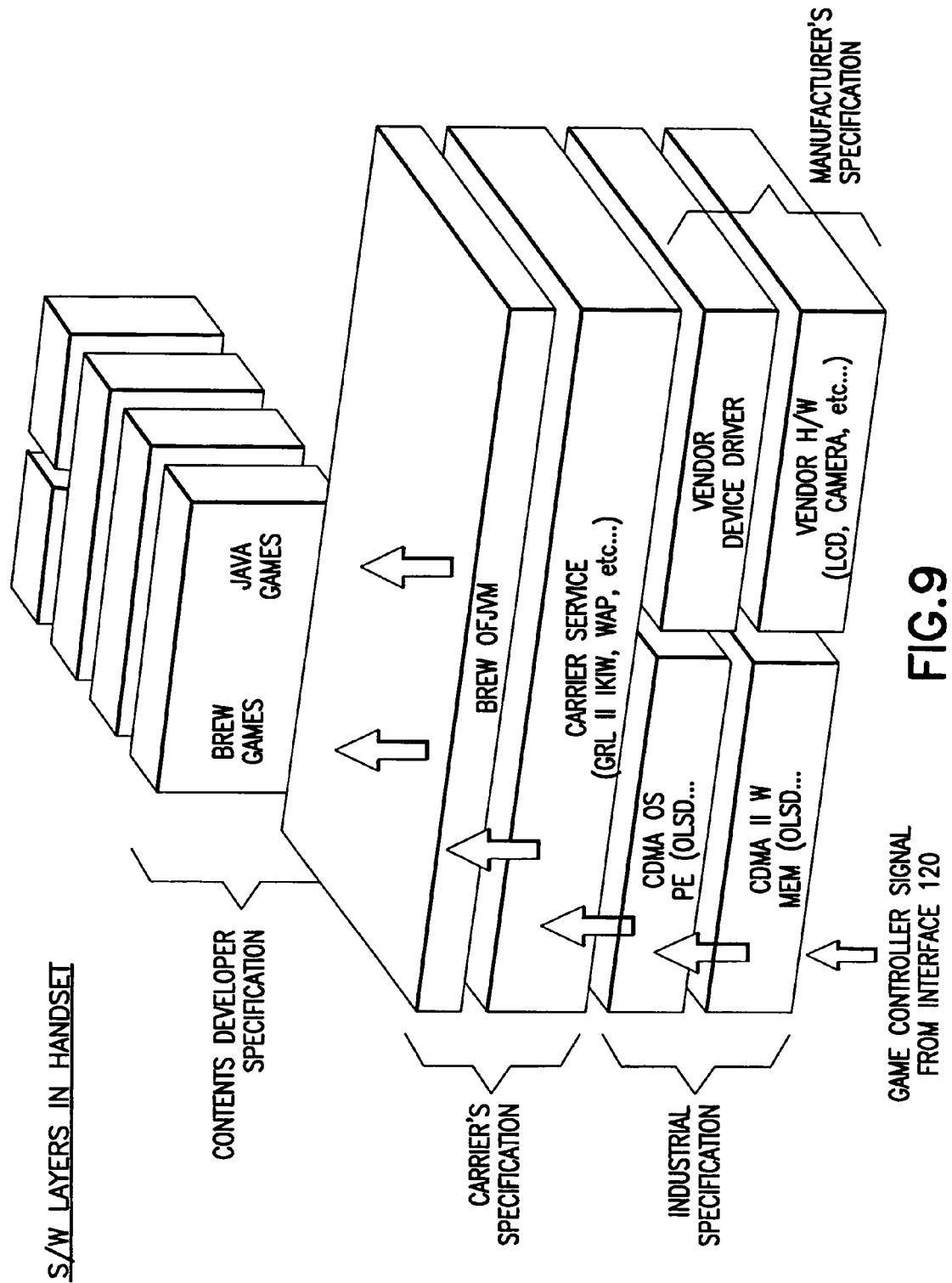

UNIVERSAL MOBILE GAMING DOCKING STATION AND CONTROLLER

BACKGROUND OF THE INVENTION

1. Field of the Invention

The invention relates to a controller for releasably capturing a mobile phone and controlling gaming software on the mobile phone.

2. Description of the Related Art

Gaming software has been available for decades and can be loaded onto a computer so that controls associated with the computer are used to play the game. Movement of the controller alters the activities that appear on the computer screen and affect the outcome of the game. The controller typically is a joystick, a steering wheel or some form of mouse that can be manipulated easily by the game player to make rapid or subtle movements that affect the way the game is being played out.

Dedicated computerized games also have been available for decades. Some electronic games are connectable to a television, while other electronic games have their own screens. Electronic games also have their own controllers that are configured to control the performance of the game in an optimal manner. Thus, an electronic game is likely to have a joystick, steering wheel, a pad with directional arrows or some version of a mouse.

Cellular phone usage continues to expand rapidly and competition is intense among the manufacturers of cellular phones and the providers of cellular phone services. This competition has driven manufacturers to meet consumer demands for smaller, lighter phones packed with more features. Most manufacturers of cellular phones provide their phones in several optional configurations in an effort to meet the preferences of different consumers. For example, some cellular phones have the size and shape of a candy bar. Others are of clamshell design, while still others have the shape and functions of a personal digital assistant (PDA). The specific dimensions of the phones within these three broad categories vary considerably. The common features for these three types of phones are a keypad, keys or buttons for entering command or control functions (e.g., send, clear, end, etc.) for entering alphanumeric data, a small screen and accessible terminals for recharging the battery of the phone.

Most cellular phone manufacturers incorporate gaming software into the phone in an effort to cater to the many consumers who have grown up with electronic games. The software enables the consumer to use the keypad and control buttons of the phone to control video images on the screen of the phone for playing a particular game permitted by the memory and hardware of the phone. The 2, 4, 6 and 8 keys on the phone are generally used to move the cursor on the screen (2=up, 4=left, 6=right 8=down). Some phones and some games permit more subtle movements with the 1, 3, 7 and 9 keys. Other keys (e.g., *, 0, #, 5, clear, etc.) are used for other controls (e.g., shoot, brake, jump) through a menu of possible games. Most cellular phones accommodate several games with a level of complexity and sophistication that was unavailable on general purpose computers several years ago. However, cellular phone game controls are nowhere near as ergonomic and user friendly as the controls available on a typical video game or on a general purpose computer. In particular, the fast-paced video game is not played easily by pressing keys that control the directional movement of a cursor. Furthermore, the very small cell phone keypad further complicates efforts to input instructions to the cellular phone for quickly and precisely controlling the actions to be taken by a cursor on a small screen.

In view of the above, it is an object of the subject invention to provide a game controller that will permit more ergonomic use of gaming software incorporated into a cellular phone.

It is another object of the subject invention to provide a docking station and game controller that can be used with any of a plurality of different types of cellular phones.

SUMMARY OF THE INVENTION

The invention relates to a universal mobile game controller having a housing. The housing contains the electrical and electronic components of the controller, including the power supply, power indicator displays, power and signal output terminals and control switches. The housing includes a phone capture section for releasably holding and positioning a plurality of differently configured cellular phones so that the cellular phone and the controller can be placed in communication electronically. Still further, the housing is configured to facilitate digital manipulation by a user.

The phone capture section may be a cavity that is recessed in an upper surface of the housing. The recess may include a friction pad for supporting the phone and resisting slippage. Additionally, the phone capture section includes resilient grips for releasably retaining a plurality of differently configured and dimensioned cellular phones in the phone capture section. The grips may be in the form of resilient clips or fingers that are aligned and disposed to engage corner edges of cellular phones on opposite sides of the keypad for urging the cellular phone down into the phone capture section. The phone capture section also preferably includes a friction pad in the recess. Thus, the cellular phone preferably is retained between the grips and the friction. The friction pad and the grips may be formed from similar materials.

The controller may further include a cable and a phone adaptor. The cable preferably extends from the housing at a location that will not interfere with the phone capture section or with the ability of a user to grip the housing during use. Thus, the housing preferably includes a recess configured to releasably hold the cable and plug in an unobtrusive position. The cable preferably has a universal plug, such as a USB 1.0 plug, permanently affixed thereto. The adaptor is configured for mating with the socket on the phone that is used for recharging a phone battery for powering the phone when the battery is low. The phone socket also is used for data transfer and receives keying instructions from the controller.

The configuration and disposition of the controls are important to the effective use of the game controller. In this regard, the controller preferably has two sets of controls that are disposed for convenient digital manipulation while a user is holding the housing. For example, the phone capture section may be in a central position on the housing and the controls may be on opposite sides of the phone capture section. Portions of the housing that carry the controls preferably are dimensioned to be gripped by the hands of the user so that the controls all are conveniently accessible by the fingers without repositioning the hands. In a preferred embodiment, the bottom face of the housing is configured for secure gripping by three or four forefingers of the respective hands. The top surface of the housing has control buttons substantially opposite the finger gripping sections. Thus, the control buttons can be actuated by the thumbs of the user. The control buttons may be covered by a resilient elastomer, and hence resemble a single control region. The thumb can be moved conveniently across the resilient cover of the control region and digital pressure exerted by the thumb will generate the appropriate signals. The control buttons preferably enable analog signals to be generated by actuation of the control buttons with varying degrees of force. Control buttons accessible by one of the hands preferably are arranged to control up, down, left, right and diagonal movements of a cursor on the screen of the cellular phone. Thus, these buttons function in the manner of a joystick on a conventional electronic video game to provide eight-way movement. Control buttons accessible by the other hand may be used for command controls.

The game controller is used by placing the user's cell phone in the phone cavity. The phone is held resiliently in position between the friction pad and the resilient clip. The plug and the cable then are removed from the cavity on the housing and the plug is engaged with the receptacle on the cell phone. A power button on the controller then is activated so that power from the replaceable or rechargeable batteries in the controller delivers power to the operative components of the controller. The user then holds the game controller in both hands and uses the control buttons accessible from one of the hands to select an appropriate one of the games that is available on a cell phone, for starting the selected game or for stopping the selected game. The signals generated by the controller will correspond to appropriate signals that could be generated by employing the less conveniently located corresponding buttons on the cellular phone. For example, one control button might deliver to the cellular phone a signal corresponding to the "CLR" button on the cellular phone. Another control button on the controller might generate a signal corresponding to the "#" on the phone. Still another button on the controller might generate a signal corresponding to a signal generated by depressing the number 5 on the pad of the cell phone.

The other control pad on the controller generates up, down, left and right signals for moving a cursor on the screen of the cellular phone. These buttons function in an intuitive and analog manner corresponding to the respective positions of the buttons on the controller. The signals generated by movement of the thumb across the directional control pad may correspond respectively to signals generated by depressing at least the numbers 2, 4, 6 and 8 for up, left, right and down respectively. These are among the outer most buttons on the standard nine digit array of numbers provided on the keypad of the cellular phone. Signals corresponding to depressing 1, 3, 7 and 9 achieve diagonal movement.

All of the gaming software is provided directly from the cellular phone. Additionally, the audio and video outputs of each game are provided by the components of the cellular phone, including the LCD screen of the cellular phone and the speaker or earphone associated with the cellular phone. With this arrangement, new games can be downloaded onto the cellular phone from the cell phone manufacturer or from the cellular service provider.

BRIEF DESCRIPTION OF THE DRAWINGS

FIG. 8 is a schematic diagram of the input buttons of the game controller of FIG. 7.

FIG. 9 is a representation of the various software layers residing in a conventional mobile phone.

DETAILED DESCRIPTION OF THE PREFERRED EMBODIMENTS

Figure 1:
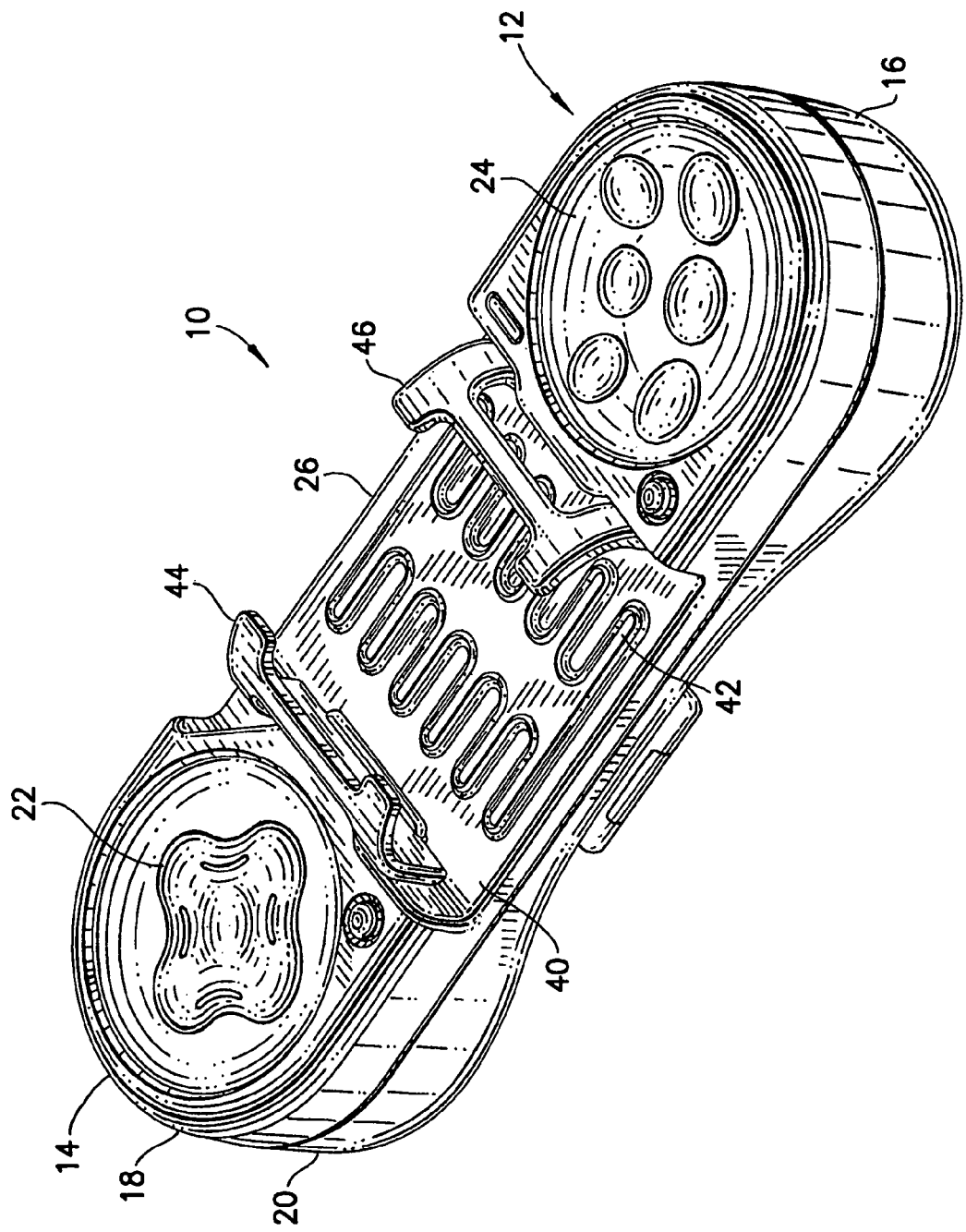
FIG. 1 is a perspective view of a game controller in accordance with the subject invention.
Figure 2:
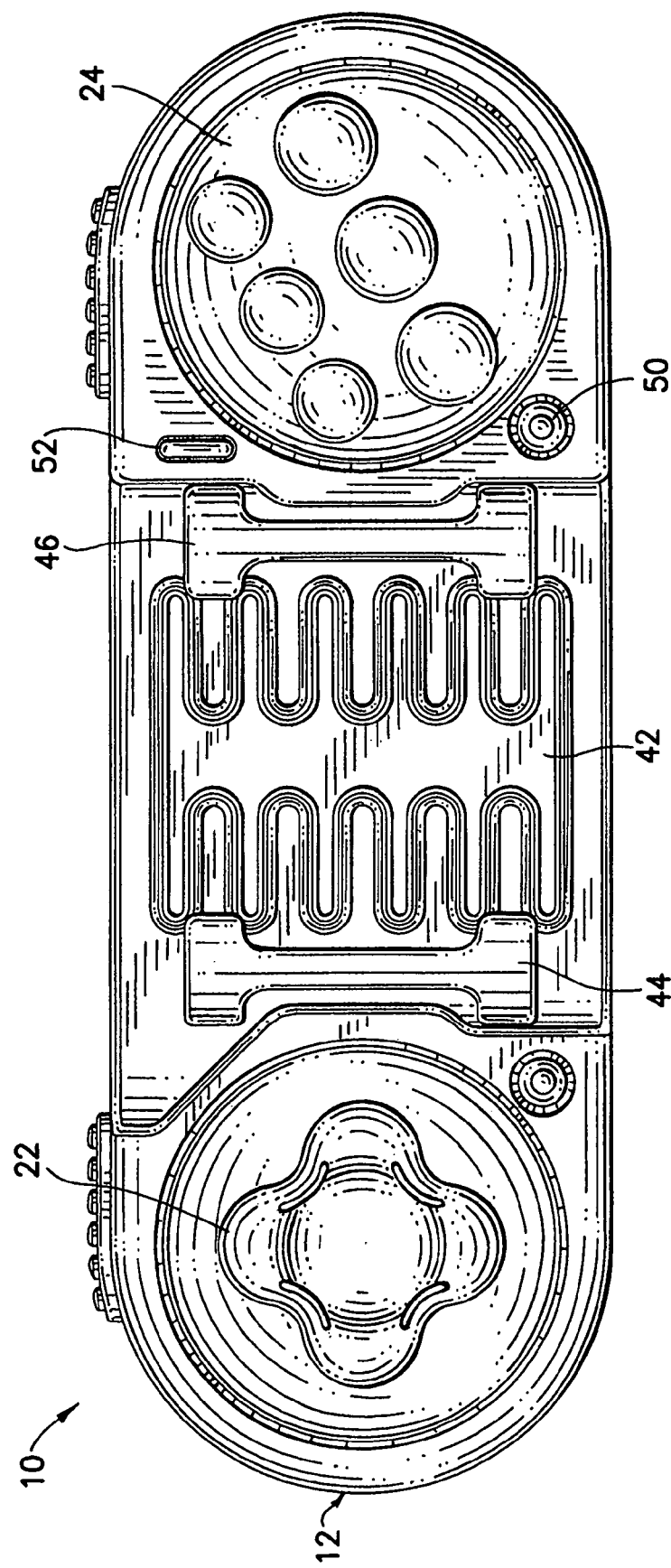
FIG. 2 is a top plan view of the game controller.
Figure 3:
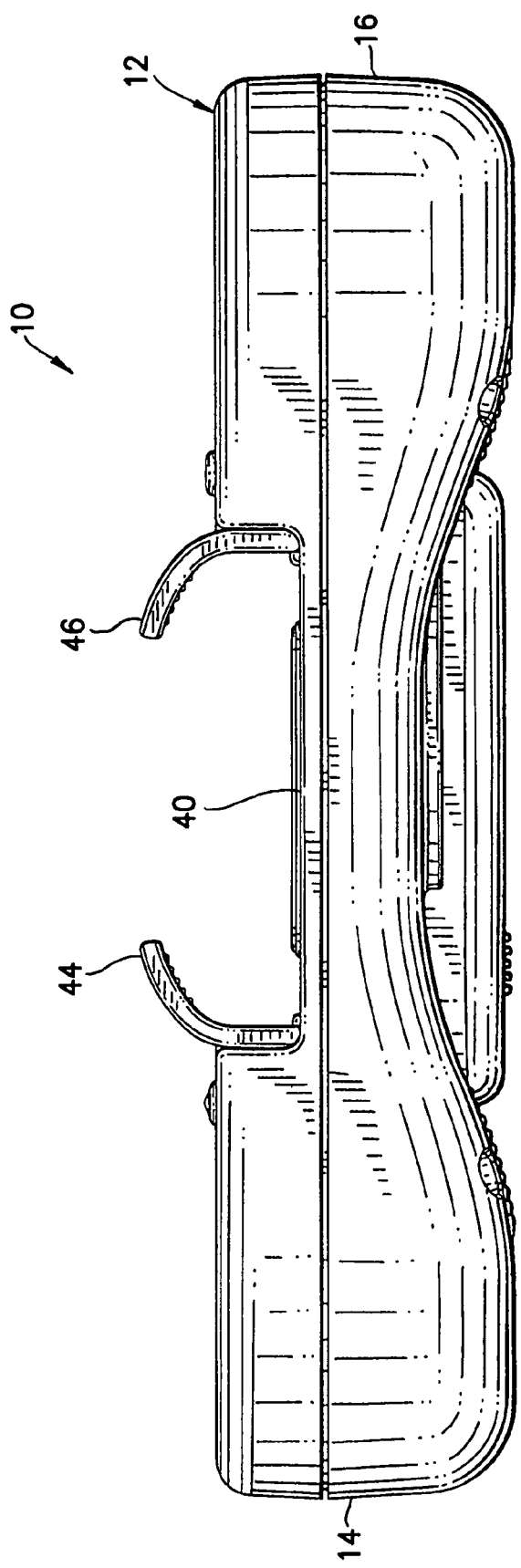
FIG. 3 is a front elevational view of the game controller.
Figure 4:
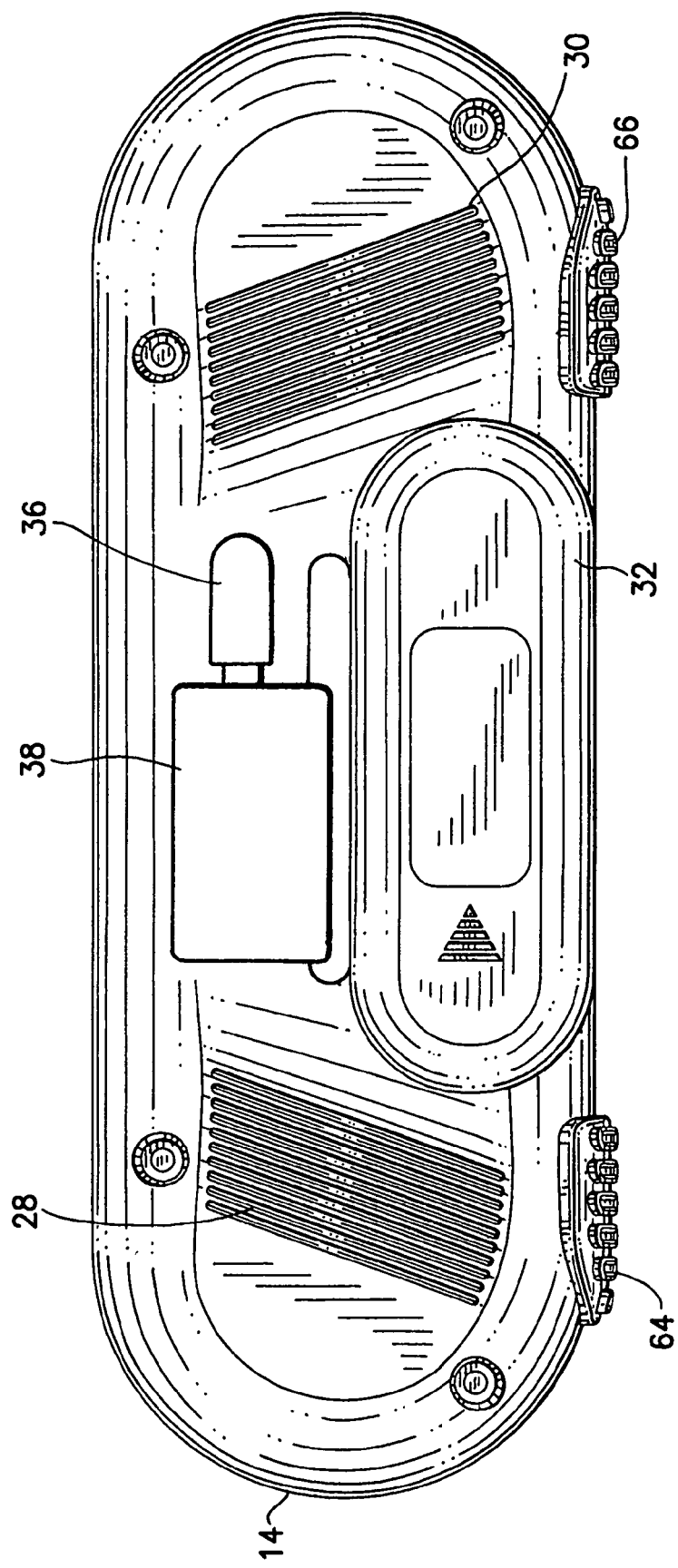
FIG. 4 is a bottom plan view of the game controller with the cable and jack securely mounted therein.

A game controller in accordance with the invention is identified generally by the numeral 10 in FIGS. 1-5. The controller 10 includes an elongate generally oval or oblong housing 12 with rounded left and right ends 14 and 16. More particularly, the housing 12 includes a top shell 18 and a bottom shell 20 that are assembled together to define an enclosure for containing the electrical and electronic components of the controller 10.

The housing 12 is configured so that areas of the housing 12 near the respective left and right ends 14 and 16 can be gripped conveniently by the respective left and right hands of a user. This convenience is achieved by the curved external shapes of the housing 12 at the left and right ends 14 and 16 and by the relative top-to-bottom dimensions in proximity to the left and right ends 14 and 16.

The top shell 18 of the housing 12 is characterized by left and right control pads 22 and 24 respectively and a phone cavity 26 disposed substantially centrally between the left and right ends 14 and 16.

The bottom shell 20 is characterized by a non-smooth surface regions 28 and 30 near the respective left and right ends 14 and 16 to facilitate gripping by fingers of the user. The non-smooth surface regions 28 and 30 are characterized by a plurality of grooves and ridges in the embodiment shown in FIG. 4. However, other knurled or textured surface configurations can be provided in place of the grooves and ridges shown in FIG. 4. The bottom shells 20 further is characterized by a battery cover 32 that covers a battery housing for receiving batteries to power the controller 10. In a preferred embodiment, the housing beneath the battery cover 32 is configured for receiving two AAA batteries.

Figure 5:
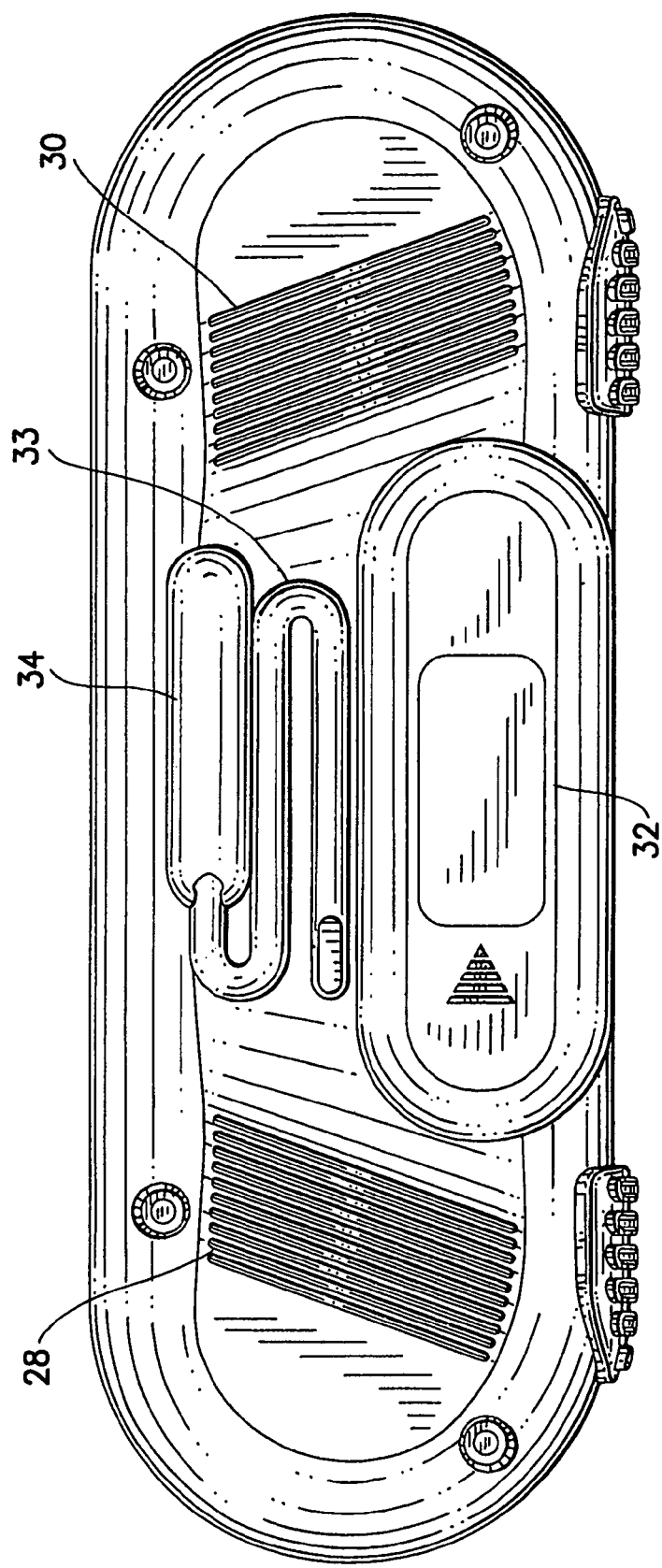
FIG. 5 is a bottom plan view of the game controller with the cable and jack separated from the housing.

The bottom shell 20 further includes a cable groove 33 and a receptor dock 34 as shown most clearly in FIG. 5. The cable groove 33 is configured for releasably receiving a cable 36 with conductors (not shown) that are connected to the electrical electronic components within the housing 12. The receptor dock 34 is configured for releasably receiving a receptor 38 that is connected to the conductor in the cable 36. The receptor 38 preferably is a USB 1.0 adaptable plug and is configured to receive an adaptor (not shown), which, in turn, can be connected to the socket on the cell phone in the phone cavity 26. The adaptor can take any form and has a universal first end configured to mate with the receptor 38 and a second end configured to mate with the particular phone. Thus, the cable 36, the receptor 38 and the adaptor function to transmit signals produced by the controller 10 to the cell phone. Portions of the bottom shell 20 between the left and right ends 14 and 16 of the housing 12 are recessed upwardly so that the receptor 38 does not project significantly below the plane defined by the finger grips 28 and 30, thereby ensuring a small profile convenient for storage, carrying and use.

The cell phone cavity 26 has a width "W" selected to exceed the widths of most commercially available cell phones. The cavity 26 is characterized by a bottom support wall 40. A friction pad 42 is mounted to or formed on the support wall 40 and provides a frictional resistance against longitudinal slipping of a cell phone placed in the cavity 26. In the illustrated embodiment, the cushion 42 includes a pattern of fingers that has been found to be very effective in preventing shifting of the cell phone in the cavity 26 along directions substantially normal to a left-to-right axis. Movement along the left-to-right axis is prevented by the side walls of the cavity 26. The cavity 26 is defined further by left and right resilient clips 44 and 46 that curve upwardly and towards one another to place a downward pressure on the opposite top side corners of the phone so that the back of the phone makes good contact with the friction pad 42 in the phone cavity 26. The clips 44 and 46 preferably are formed from an acetal polymer, such as Delrin available from DuPont. The friction pad 42 may be formed from the same or similar material, but preferably the friction pad 42 is slightly softer and stickier than the clips 44 and 46.

The top surface of the housing 12 includes the controls and signal indicators. In particular, a power button 50 is accessible through the top shell 18 at a location to the right of the phone cavity 26. A pushing force exerted on the power button 50 initiates power from the batteries for operating the controller 10. A power indicator light 52 is visibly exposed to the right of the phone cavity 26 to confirm the on/off status of the controller after actuation of the power button 50. The power indicator light 52 preferably is operable for indicating a low battery, such as by generating a flashing signal when the batteries need to be replaced. A select button 54 is provided neatly to the left of the phone cavity 26 and allows the user to select an operational mode for the controller 10.

The left and right control pads 22 and 24 have flexible elastomeric covers 56 and 58 respectively with shapes that identify locations that can be depressed for producing signals. Signals are produced by switches within the housing 12 and buttons that are disposed between switches and the covers 56 and 58 on the control pads 22 and 24.

The control pad 22 functions essentially as a joystick for producing signals that will move a cursor up, down, left or right. The buttons beneath the resilient cover 56 can be arranged in a cross-shaped pattern, but may also be arranged in a square pattern. The cross-shaped pattern will dispose the switches approximately in the twelve o'clock, six o'clock, nine o'clock and three o'clock positions for generating up, down, left and right signals respectively. These signals may correspond to signals produced by depressing the numbers 2, 8, 4 and 6 respectively on the cell phone keypad. A square pattern of buttons in the control pad 22 could be provided to permit diagonal movements of the cursor for generating signals the equivalent of pressing the numerals 1, 3, 7 and 9 on the cell phone key pad. All of the directional controls on the control pad 22 in the illustrated embodiment can be activated conveniently by the thumb of the left hand without repositioning the forefingers of the left hand.

The command control pad 24 is operative for generating signals that may control the game that is selected. In this illustrated embodiment, six command controls are provided and may be operative to produce signals that will correspond to depressing the CLR, OK, 5, * or #. They are keys that are not required for the eight-way directional control. Once again, the command control buttons of the command control pad 24 are covered by the resilient cover 56 with a non-planar shape to denote the locations of the buttons. The buttons of the command control pad 24 are arranged for convenient access by the thumb of the right hand without repositioning the forefingers of the right hand.

The controller 10 further include left and right firing triggers 64 and 66 disposed along a front edge of the housing 12 near the respective left and right control pads 22 and 24. Thus, the firing triggers 64 and 66 are easily accessible by the respective left and right index fingers and can be actuated for generating a firing action, a jumping action or the like as part of the particular game. Accordingly, a user's thumb can be placed on the control pad 22 or 24, the user's index finger can be placed on the firing trigger 64 or 66 and the remaining three forefingers can be placed on the grips 28 and 30 on the bottom shell 20 of the housing 12.

The controller is used by inserting the cellular phone into the phone cavity 26. The phone will be held resiliently between the friction pad 42 and the grips 44 and 46. Left-to-right sliding movement is prevented by the side walls of the cavity 26. Front-to-rear movement of the cellular phone in the cavity 26 is prevented by the resilient forces exerted by the grips 44 and 46 that urge the rear face of the cellular phone against the friction pad 42. The user then removes the receptor 38 from the receptor cavity 34 on the bottom shell 20. The cable 36 then is played out sufficiently to enable the receptor 38 to be connected electrically with the jack or socket on the cellular phone. The user then presses the power button 50 with the thumb of the right hand. Power is indicated by the LED light 52 between the cavity 26 and the right control pad 24. The user then can employ the buttons identified by the non-planar regions on the command control pad 24 to select an appropriate game and to initiate the play of the game. The software for performing the game is contained within the cellular phone. Audio and visual signals also are generated by the cellular phone. The game is played conveniently while gripping the opposite left and right ends of the controller 10 between the thumb and forefingers of the respective left and right hands. Movement of the cursor is controlled conveniently and intuitively by depressing the appropriate non-planar regions of the directional control pad 22. Other command functions are carried out with the right thumb on the command control pad 24. The firing triggers 64 and 66 can be actuated by the left and right index fingers as part of the performance of the game.

Figure 7:
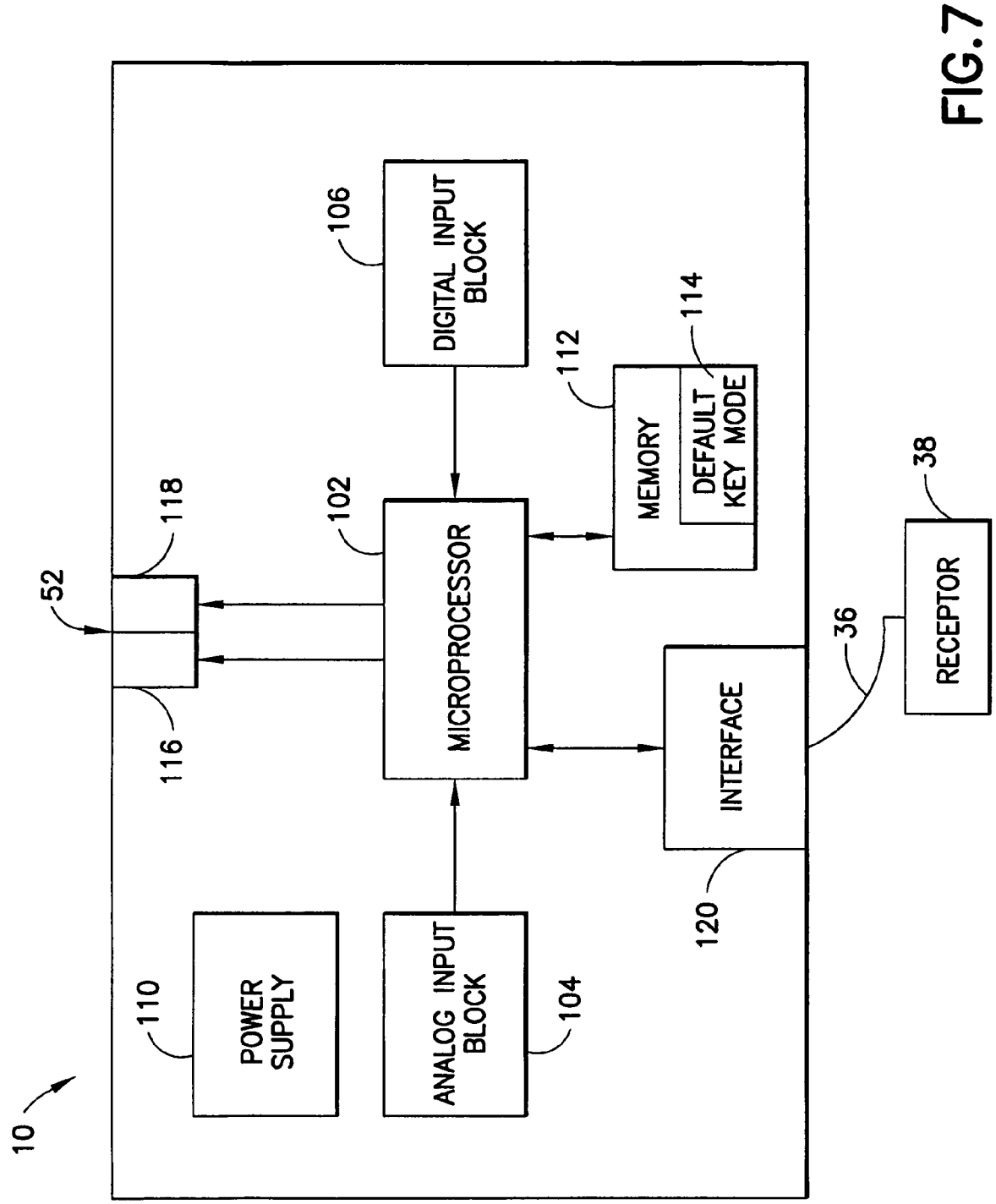
FIG. 7 is a block circuit diagram of the game controller in accordance with the subject invention.

Referring now to FIG. 7, a circuit diagram of the game controller is illustrated. The game controller 10 includes a microprocessor 102 for controlling the overall operations of the game controller and for receiving input from a user, correlating the input to a key of a mobile phone, generating a key input signal and for transmitting the key input signal to the mobile phone coupled to the game controller.

Figure 6:
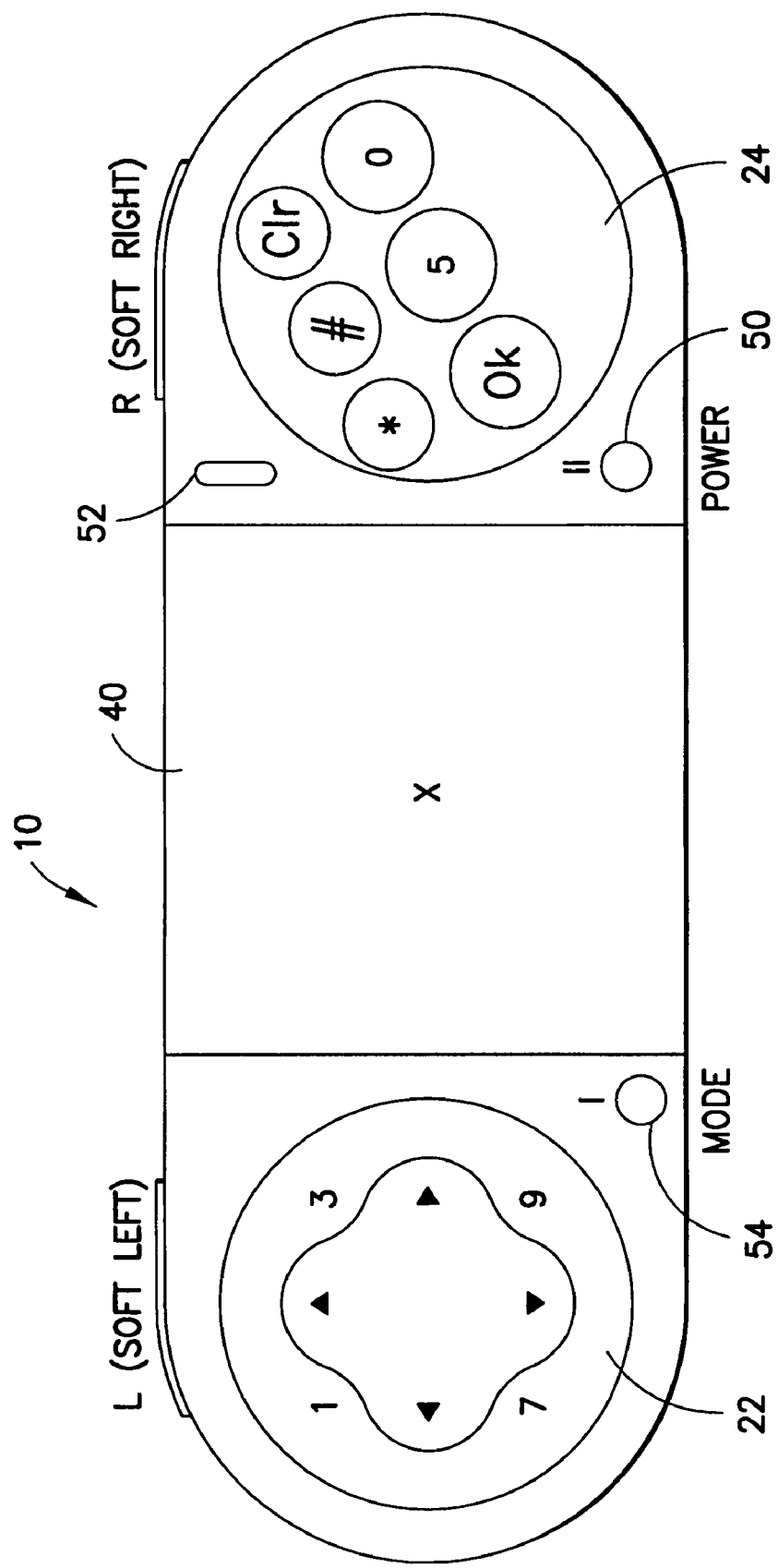
FIG. 6 is a schematic top view of the game controller showing one possible arrangement of key identifiers and their respective locations.
Figures 1, 8A:
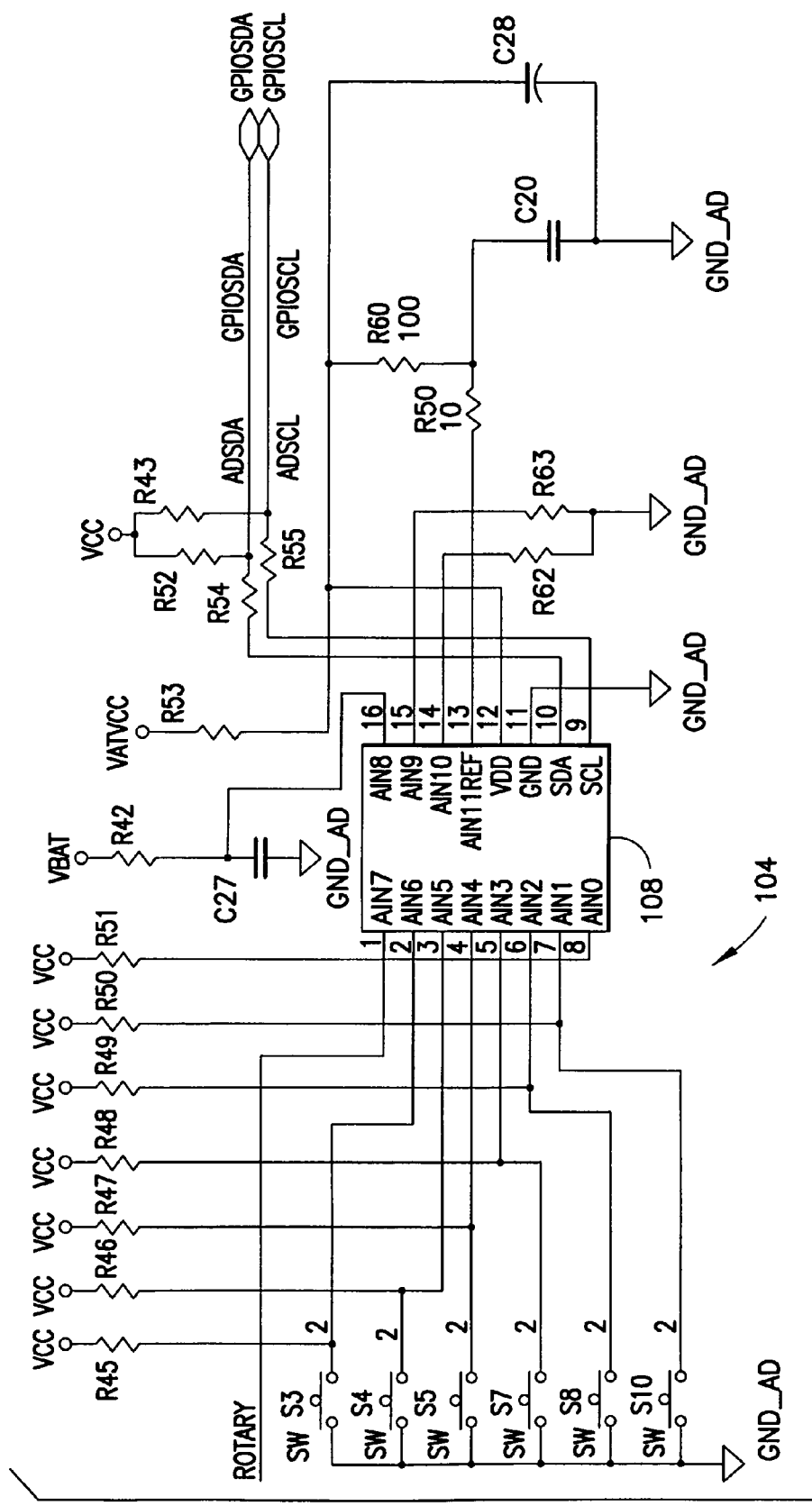
Figures 2, 8A:
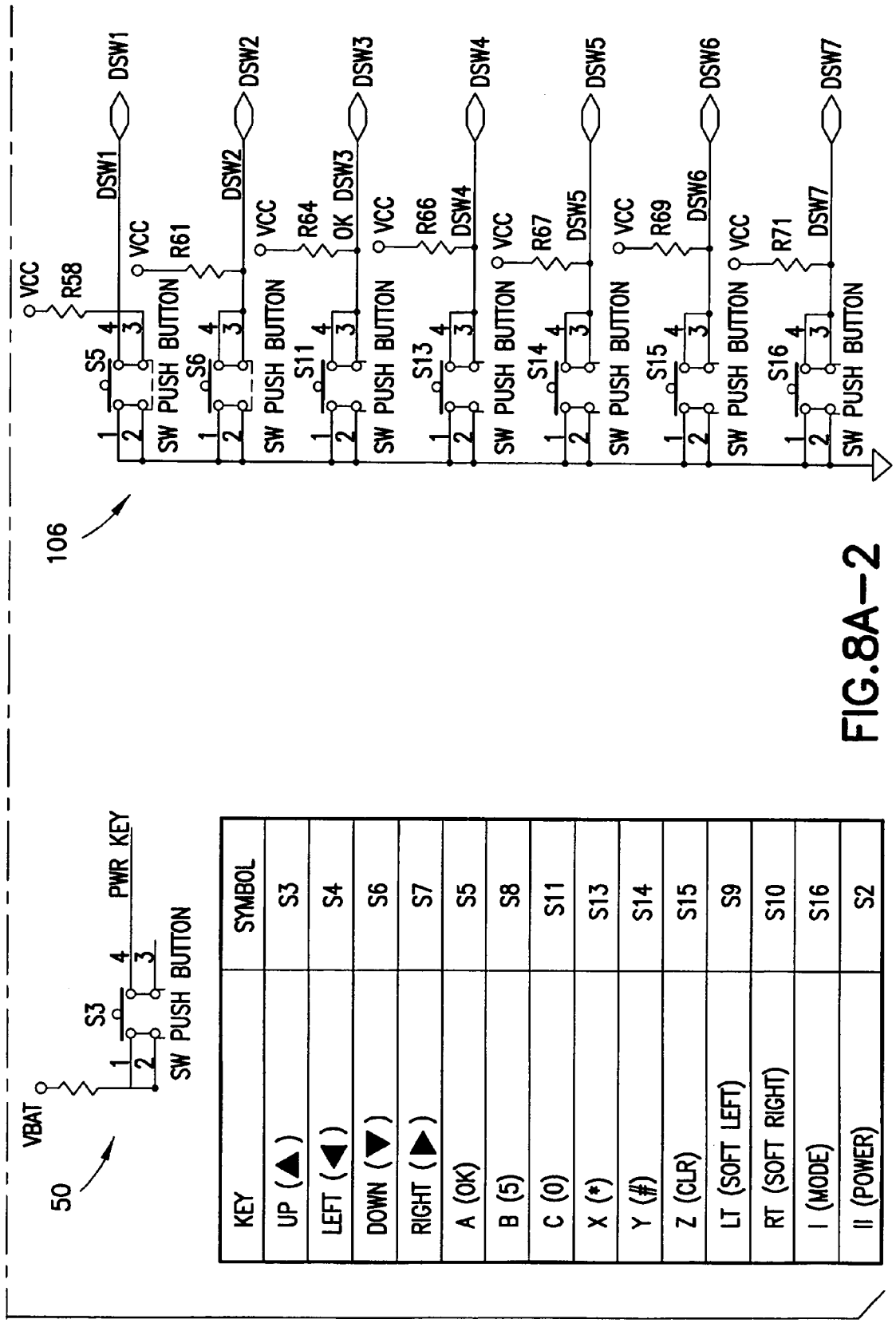

The game controller further includes a plurality of input buttons as described above. The plurality of input buttons are generally characterized as either analog input buttons 104 or digital input buttons 106. FIG. 8 is a schematic diagram showing the analog input buttons 104, digital input buttons 106 and power button 50. FIG. 8 also includes a legend correlating the buttons shown on the top surface of the game controller shown in FIG. 6 and the buttons, e.g., switches, shown in the various circuit diagrams of FIG. 8.

The analog input block 104 includes a plurality of switches S3, S4, S6, S7, S9, S10 each coupled to an analog-to-digital converter (ADC) 108. Upon digital pressure asserted on any of switches S3, S4, S6, S7, S9, S10, the ADC 108 will converter the incoming signal into a digital signal that is compatible with the microprocessor 102. The ADC 108 will than output the converted signal along electrical lines GPIOSDA and GPIOSCL which are in electrical communication with the microprocessor 102. The digital input block 106 includes a plurality of switches S5, S8, S11, S13, S14, S15, S16 each coupled directly to the microprocessor 102.

Furthermore, a power button, e.g., switch S2, is coupled to a power supply for initiating power to be supply to the game controller 10. As described above, the power supply 110 may be a plurality of conventional AAA batteries. It is to be appreciated that the power supply 110 may also include a secondary long-life battery, e.g. a lithium battery, which can supply enough power to the game controller 10 to power a memory for storing information while the AAA batteries are being replaced.

The game controller 10 includes a memory 112 for storing at least one key mapping configuration. The at least one key mapping configuration is a database file correlating the input buttons of the game controller 10 to the keys of a mobile phone that would be employed to play a particular game stored on the mobile phone. For example, in a first game, the at least one key mapping configuration may correlating the "0" button on the right control pad 24 to a firing function in a shooting game. In a second different game, a second key mapping configuration may correlate the "0" button on the right control pad 24 to a swing function of a bat in a baseball game. Preferably, the memory 112 will include a default key mode configuration 114 which will be employed if the specific game being played does not required a specific key mapping configuration. The operation and loading of specific key mapping configurations will be described below in more detail.

Although the power indicator light 52 appears through a single aperture on the top shell 18 of the game controller 10, the power indicator light 52 includes a red LED 116 and a green LED 118 in electrical communication with the microprocessor 102. The microprocessor 102 controls each individual LED 116, 118 to indicate a state of the game controller. The LED behavior is defined in Table 1 below:

TABLE 1

| LED Behavior | State |
| --- | --- |
| Off | Controller is off |
| Solid Green | Controller power is on |
| Slow Blink Green | Controller is auto updating its key mapping configuration |
| Slow Blink Red | Controller is on, battery power low |
| Solid Red | Controller is on, initializing |

An interface 120 is provided for interfacing the game controller 10 to the mobile phone. The interface 120 will receive instructions from the microprocessor 102 and transmitter the instructions to the mobile phone. Similarly, the interface 120 will receive instructions and/or a key mapping configuration from the mobile phone and transmit same to the microprocessor 102. The interface 120 may be implemented as a combination of software and hardware that is compatible with the mobile phone. The interface 120 may include one or more of a serial transceiver, a Universal Asynchronous Receiver-Transmitter (UART), a Universal Serial Bus (USB) transceiver, an RS-232 transceiver, an IrDA device, a Bluetooth device or any other known communication protocol transceiver known in the art. Instructions and/or data will be sent to the mobile phone from the interface 120 via cable 36 and the appropriate receptor 38 selected for the particular mobile phone.

Referring to FIG. 9, the various software layers residing in a conventional mobile phone, e.g., a CDMA phone, are illustrated. The basic operations of the mobile phone are governed by three groups of specifications. The first group is governed by an industrial specification, e.g., the CDMA specification. At this level, the operating system for the CDMA chipset is defined, also known as REX, for controlling radio operation of the mobile phone and for other common phone functions. Furthermore, the hardware specification is defined at this level, for example, for the MSM (mobile station modem) chip. Next, a manufacturer's or vendor's specification governs the operation of vendor added features of the mobile phone, e.g., an LCD display, camera, etc. Lastly, the mobile phone carrier's specification defines what services the phone manufacturer must make available to the carrier. These services may include billing systems, content services, network services, etc. The carrier specification may also define an application platform such as BREW (Binary Runtime Environment for Wireless) or JVM (Java Virtual Machine) for executing applications such as games. Subsequently, once the application platform has been specified, any application must conform to a content developer specification, such applications may include BREW games or Java games.

Figure 10:
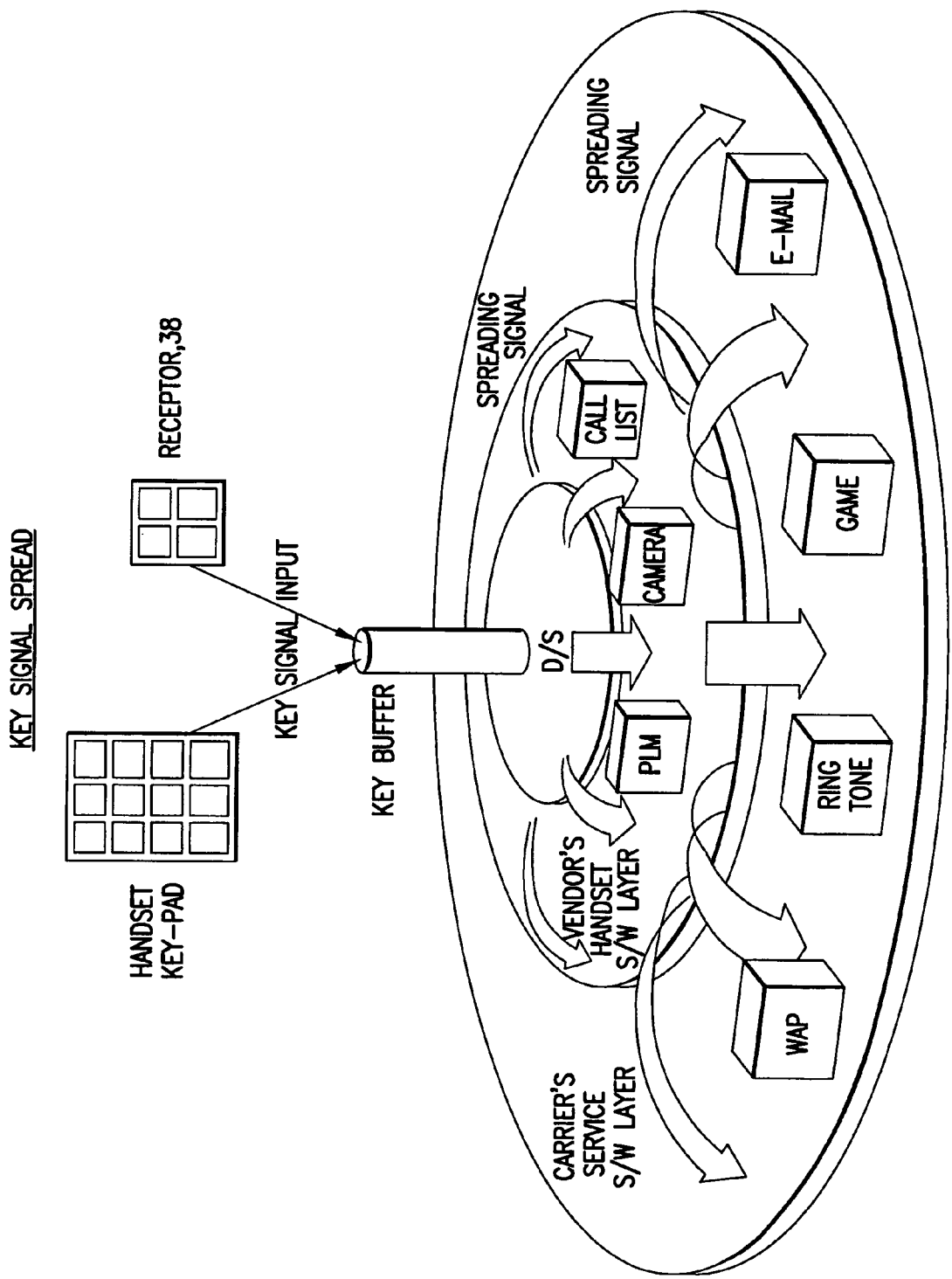
FIG. 10 is a representation of how the game controller of the subject invention replicates key signal input of a keypad of a conventional mobile phone.

To achieve wider universal acceptance, the game controller 10 of the subject invention interacts with the mobile phone at the most basic level, e.g., the CDMA specification level. The game controller 10 preferably uses a USB 1.1 connection for the physical layer, which is defined by the CDMA chip specification, and sends the appropriate gaming signals defined by the CDMA specification, not the carrier or manufacturer specification. By employing this approach, the game controller can work with any CDMA mobile phone as will be further described in relation to FIG. 10.

When any of the buttons of the game controller 10 are pressed, the microprocessor 102 will determine which button is pressed, will correlate the pressed button to a key associated with a particular game via a key mapping configuration and will generate the appropriate signal according to the CDMA specification. When the mobile phone's serial interface handler receives the generated signal, it notifies the operating system (O/S) of the mobile phone and the O/S sends a key press signal to a key input buffer. When the O/S places the key press signal into the key input buffer, the signal from the controller becomes identical with a key press signal from the actual keypad of the mobile phone handset. After the key press signal is placed in the key input buffer, any software application which is currently running will receive the key press signal, e.g., spreading signal of FIG. 10. Because there are no differences between signals generated from the keypad of the mobile phone or the game controller 10, any software application running on the mobile phone will operate in the same way with a key-press of the mobile phone's keypad or the game controller 10.

Figure 11:
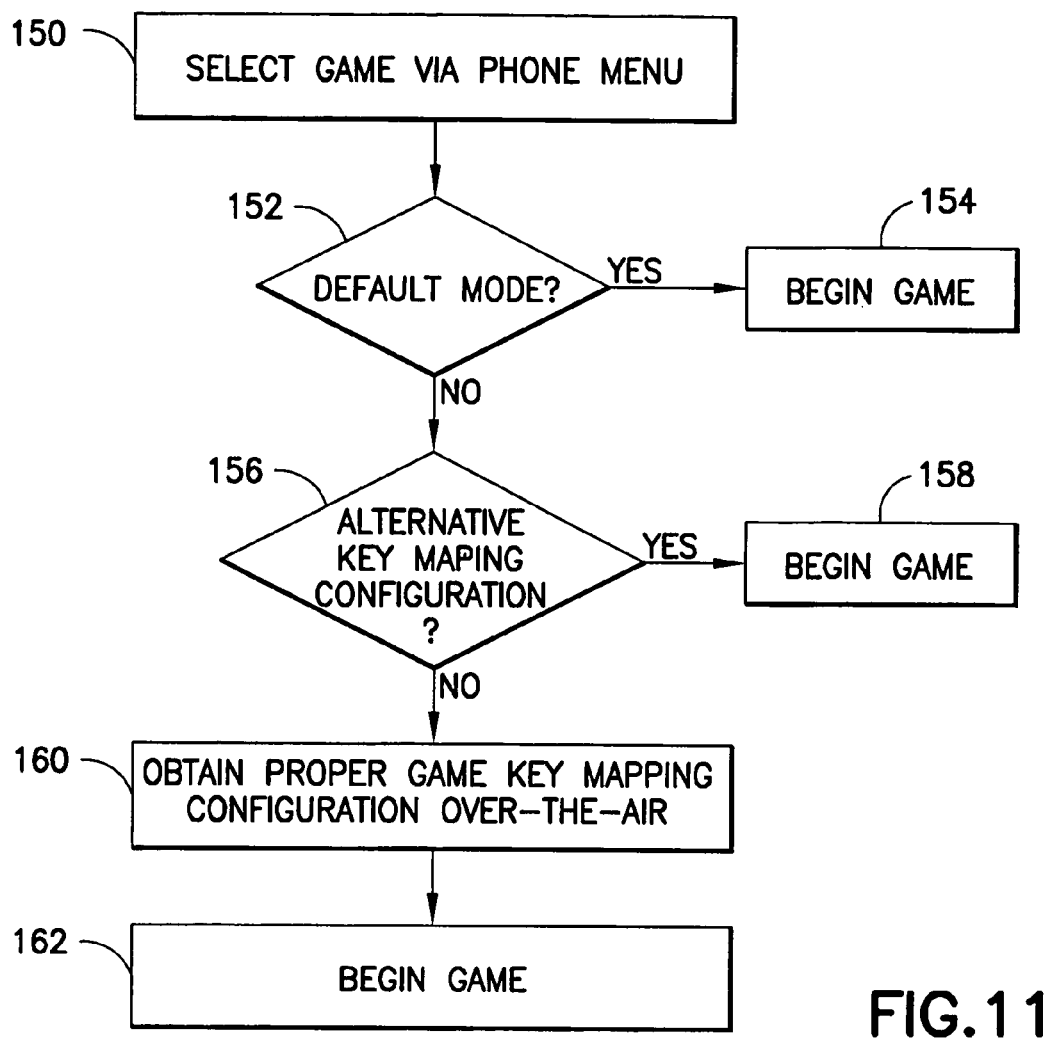
FIG. 11 is a flow chart illustrating a method for configuring the game controller depending on a particular game being played.

An operation of the game controller 10 will now be described with reference to FIG. 11. Initially, a mobile phone is inserted into the phone cavity 26 of the game controller and is electrically coupled to the game controller 10 via the appropriate receptor 38. Once the game controller is powered on by pressing the power button 50, a user may utilize the left control pad 22 to navigate through a menu of the mobile phone to select a game (step 150). Once the game is selected, the microprocessor 102 of the game controller 10 will determine if the game can be played with the default mode key configuration (step 152). If the game can be played with the default mode key configuration, the game will begin immediately (step 154). If the game can not be played with the default key mode configuration, the microprocessor 102 will check the memory 112 to determine if the specific key mapping configuration for that game was previously downloaded and stored by the user (step 156). If the key mapping configuration is in memory 112, the microprocessor will load the key mapping configuration and the game will begin. (step 158). Alternatively, the user may select the proper key mapping configuration from a plurality of key mapping configurations stored in the memory 112.

Figure 12:
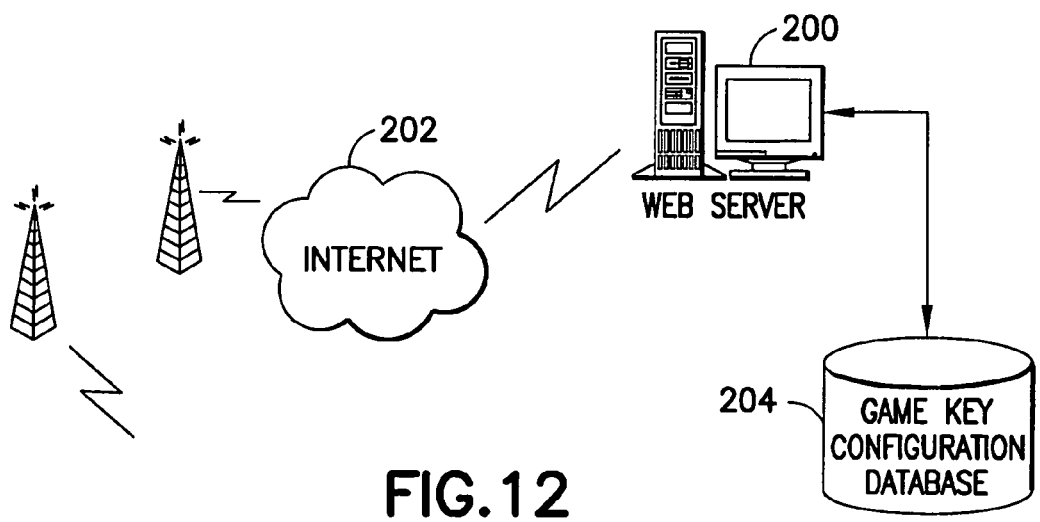
FIG. 12 is a diagram illustrating an over-the-air (OTA) key configuration update mode.

If the game selected can not utilize the default key mode configuration and an alternative key mapping configuration is not available in memory, the user will be prompted to press the mode select button 54 to initiate an automatic key mode update. Using the mobile phone as a modem, the game controller 10 will obtain the proper game key configuration "over-the-air" (OTA) and update automatically (step 160), as depicted in FIG. 12. A web server 200 residing on the Internet 202 will include a game key configuration database 204. The database 204 will contain key mapping configurations for games compatible with the mobile phone that cannot utilize the default key mode configuration. As new games become available, the database 204 will be updated appropriately. Upon initiation of the automatic key mode update, the game controller 10 will utilized the mobile phone 206 as a modem and through the appropriate communication protocols gain access to the Internet 202 and subsequently the web server 200. Based on the game selected initially by the user, the web server 200 will access the database 204, select the proper key mapping configuration and download same to the game controller. Once the proper key mapping configuration is downloaded, the game will begin (step 162).

It is to be appreciated that the OTA update for a specific game is performed only once and the downloaded key mapping configuration will remain in memory 112 as long as the game is stored on the mobile phone or until the configuration is deleted by the user. The next time the same game is played, the game controller 10 will allow the user to select the proper stored key mapping configuration and the game will begin immediately—no OTA update will be required.

While the invention has been described with respect to a preferred embodiment, it is apparent that various changes can be made without departing from the scope of the invention as defined by the appended claims.

What is claimed is:

1. A game controller for use with a cellular phone, the game controller including a housing having a phone dock with a phone supporting surface for engaging a rear face of the phone, the phone supporting surface having opposite first and second sides, first and second resilient clips projecting up from positions in proximity to the respective first and second sides of the phone supporting surface and curving towards one another so that each of the resilient clips has a gripping surface facing substantially toward the phone supporting surface for resiliently gripping a top face of the phone for releasably holding the phone in the phone dock, a control jack configured for electrical connection to the phone and left and right control pads on opposite respective sides of the phone dock for generating control signals to be sent from the controller through the jack and to the phone.

2. The controller of claim 1, wherein the phone supporting surface of the phone dock includes a friction pad formed from a material for resiliently engaging the rear face of the phone and frictionally resisting sliding movement of the phone in the phone dock.

3. The controller of claim 1, wherein the housing has a top surface, the control pads being formed on the top surface and including control buttons for generating electrical signals for transmission to the phone via the jack, the housing further including a front face aligned substantially normal to the top surface and including at least one firing trigger for generating signals to be transmitted to the phone via the jack.

4. The controller of claim 1, wherein one of the control pads includes buttons arranged in a cross and operative for generating up, down, left and right signals.

5. The controller of claim 4, wherein a second of the control pads includes a plurality of buttons for generating command signals.

6. The controller of claim 1, wherein the housing includes opposite top and bottom surfaces the top surface having the control pads, the bottom surface being provided with surface irregularities to facilitate gripping by forefingers of a user's hands.

7. A game controller for use with a mobile phone, the game controller comprising:
a plurality of buttons for generating at least one control signal of a game being played on the mobile phone;
a memory for storing at least one default key mapping configuration, the key mapping configuration for correlating the plurality of buttons to keys of the mobile phone;
a microprocessor for receiving the at least one control signal generated by the plurality of buttons and generating a key press signal relating to at least one key of the mobile phone; and
an interface in electrical communication with the mobile phone for transmitting the key press signal to the mobile phone,
wherein the microprocessor is adapted to determine if the default key mapping configuration is compatible with at least one selected game and, if the default key mapping configuration is not compatible with the at least one selected game, the microprocessor is adapted to obtain at least one additional key mapping configuration wirelessly employing the mobile phone as a modem.

8. The game controller of claim 7, wherein the plurality of buttons include a plurality of digital inputs and a plurality of analog inputs.

9. The game controller of claim 7, wherein the key press signal is compatible with an operating system of the mobile phone.

10. The game controller of claim 7, wherein the microprocessor is adapted to selected an appropriate key mapping configuration for at least one selected game.

11. The game controller of claim 7, wherein the interface is a serial transceiver, a Universal Asynchronous Receiver-Transmitter (UART), a Universal Serial Bus (USB) transceiver, an RS-232 transceiver, an IrDA device or a Bluetooth transceiver.

12. The game controller of claim 7, wherein the key press signal is generated in accordance with the CDMA specification.

13. The game controller of claim 7, further comprising a housing having a phone dock with a phone supporting surface for engaging a rear face of the mobile phone, resilient clips projecting up from the phone supporting surface and towards one another for resiliently gripping the mobile phone and releasably holding the mobile phone in the phone dock.

14. The game controller of claim 13, wherein the phone supporting surface of the phone dock includes a friction pad formed from a material for resiliently engaging the rear face of the mobile phone and frictionally resisting sliding movement of the mobile phone in the phone dock.

15. The game controller of claim 13, wherein the housing has a top surface, the plurality of buttons being formed on the top surface, the housing further including a front face aligned substantially normal to the top surface and including at least one firing trigger for generating signals that can be transmitted to the mobile phone via the interface.

16. The game controller of claim 13, wherein a first portion of the plurality of buttons are arranged in a cross and operative for generating up, down, left and right signals.

17. The game controller of claim 16, wherein a second portion of the plurality of buttons are adapted for generating command signals.

* * * * *